Figure 1:
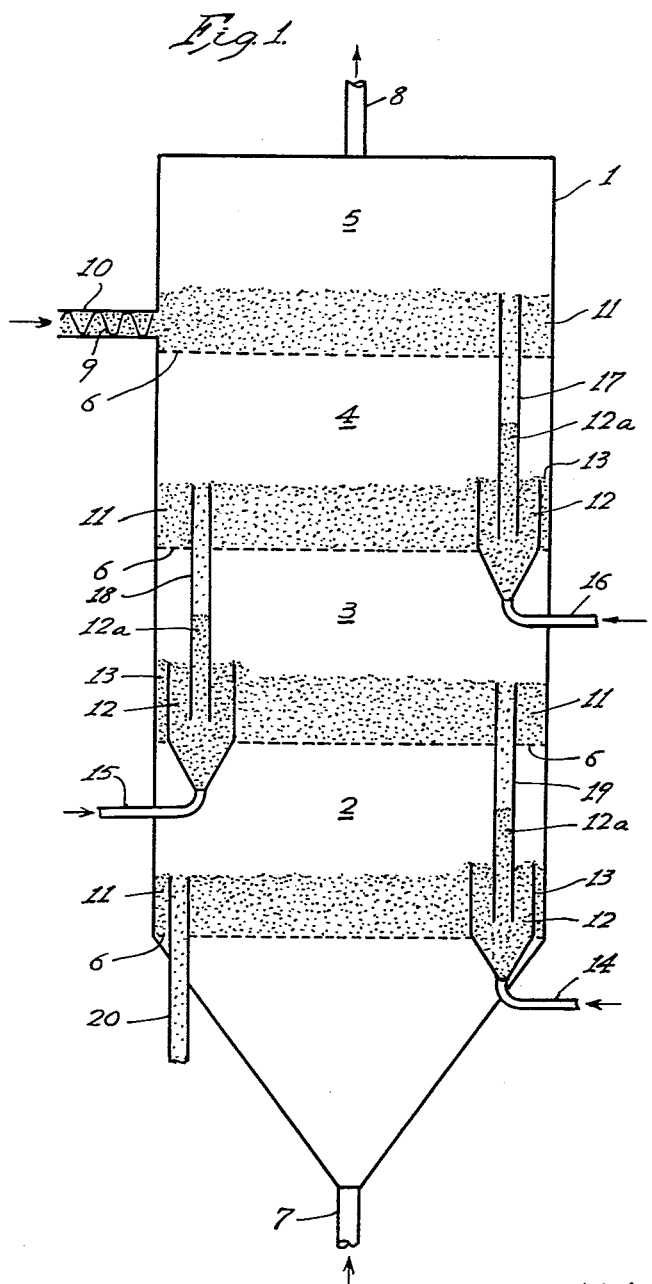

Aug. 16, 1955  W. M. FISH  2,715,548
METHOD OF TRANSFERRING SOLIDS
Filed Dec. 24, 1952  2 Sheets-Sheet 1
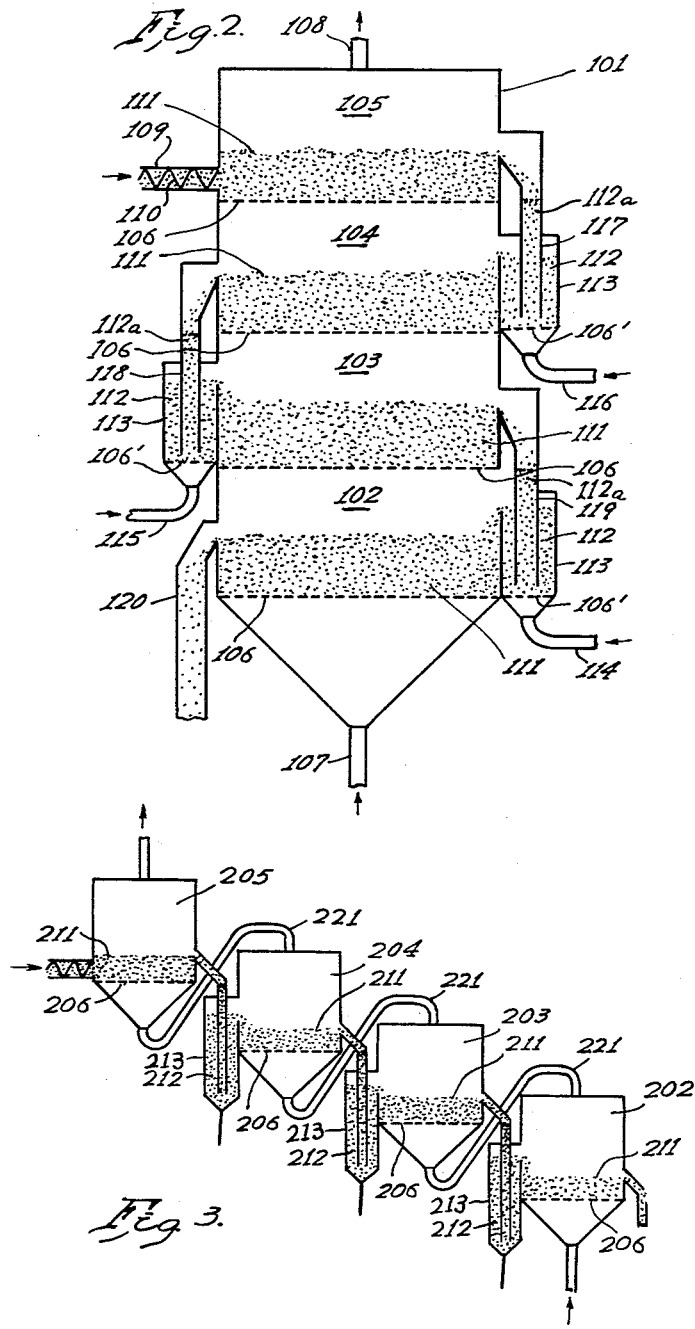
INVENTOR.
William M. Fish.
BY
Edward B. Foote
ATTORNEY

United States Patent Office 2,715,548
Patented Aug. 16, 1955

2,715,548

METHOD OF TRANSFERRING SOLIDS

William M. Fish, Rock Hill, Mo., assignor to Aluminum Company of America, Pittsburgh, Pa., a corporation of Pennsylvania Application December 24, 1952, Serial No. 327,880

2 Claims. (Cl. 302—29)

This invention relates to contacting solids and gases, and relates particularly to the transferring of solids between chambers containing fluidized beds thereof.

It has heretofore been proposed to effect contact between finely divided solids and a gas by passing a stream of the gas upwardly through successive chambers or zones, in each of which the rising stream of gas maintains such solids in a fluidized, pseudo-liquid condition. The solids are transferred downward from one of the chambers or zones to another, thereby providing counter-current flow of the solids and the gas. Such transfer can be effected by means of a vertical tube or conduit extending between two successive chambers, the solids overflowing from the fluidized bed in one chamber into the upper end of that tube and falling through the tube into the next chamber. When such conduits are used, the gas stream which flows between the two chambers must be kept from by-passing through the conduit, for otherwise it does not contact the solids in the upper bed. Such by-passing can be prevented by having the end of the conduit through which solids are discharged immersed in the fluidized bed into which the solids are transferred. However, to use that procedure it is first necessary to establish the latter bed to the necessary depth initially, and also to re-establish it whenever use of the system has been interrupted, or whenever for any reason during operation of the system the level of the bed falls below the outlet end of the conduit. Various expedients have been proposed for avoiding such difficulties, such as providing the conduits with valves that can be closed to prevent by-passing of gas through them while the beds are not deep enough to cover the outlet end of the conduits, or providing each chamber with a separate auxiliary system for feeding solids to it. However, such expedients do not afford a fully satisfactory solution to the problem.

It is the object of this invention to provide an improved method of preventing gas which is to fluidize solids in separate chambers from by-passing through a conduit used to transfer solids between those chambers. It is a further object of this invention to provide an improved way of transferring solids between separate chambers containing fluidized beds thereof, by means of a conduit extending between the chambers.

In practicing my invention, finely divided particles are transferred downward from one chamber containing a fluidized bed of such particles to another chamber through a conduit extending between the two chambers. The chamber into which the particles are conveyed through the conduit contains two separately fluidized beds of solids, the lower end of the conduit being immersed in one of those two beds so that the conduit contains a column of fluidized solids which offsets the pressure drop between the two chambers. Moreover, the outlet in the lower end of the conduit is sufficiently far below the surface of the bed in which it is immersed that there are enough fluidized solids of that bed around the conduit that upon any increase in gas pressure in the chamber into which the solids are being transferred, relative to the gas pressure in the other of the two chambers, that the column of fluidized solids in the conduit will increase sufficiently in height—due to solids backing up into the conduit from the surrounding bed—for the pressure drop through that column to offset such increase. As a result, the outlet of the conduit is at all times sealed by a column of fluidized solids in the conduit.

As solids are fed through the conduit and into the bed in which the outlet end of the conduit is immersed, solids overflow from that bed into the other of the two fluidized beds. From the latter bed the solids may be transferred to another chamber of the system in the same manner as described above, or may be removed from the system.

The invention will be further described with reference to the accompanying drawings, Fig. 1 being a diagrammatic view of apparatus for use in carrying out the invention, and Figures 2 and 3 showing modified forms of the apparatus of Fig. 1.

Referring to Fig. 1, a cylindrical column 1 is divided into chambers 2, 3, 4 and 5 by spaced perforated plates 6. A gas feed line 7 is provided to feed into the lower end of column 1 a stream of the gas which it is desired to bring in contact with finely divided material. At the upper end of the column is a gas outlet line 8 communicating with the chamber 5. A conduit 9 with a screw conveyor 10 therein serves to feed finely divided solids into the chamber 5, the screw conveyor 10 fitting closely enough in the conduit that the conveyor and solids in the conduit provide a seal against escape of gases from the chamber 5.

Each of the chambers 2, 3, 4 and 5 contains a fluidized bed 11 of finely divided solids, the beds being fluidized by the gas rising through the perforations in the plate 6 between adjoining chambers. In addition, the chambers 2, 3 and 4 contain fluidized beds 12 of solids in auxiliary chambers formed by the cylindrical casings 13, whose lower portions are closed except where they are connected to the gas lines 14, 15 and 16, which feed gas into the casings to keep the beds 12 fluidized.

A vertical conduit 17 extends between the chambers 4 and 5, the upper end of the conduit being open and being at the level of the surface of the bed 11 in the chamber 5. The lower end of the conduit 17 is immersed in the fluidized bed 12 of chamber 4, and a portion of the latter bed extends upward into the conduit, the latter portion forming a column 12a of fluidized solids in the conduit. The conduit is immersed deeply enough in the bed 12 that there is a sufficient volume of solids of that bed outside of the conduit and above the outlet thereof to permit the maximum increase in pressure drop which occurs between the chambers 4 and 5 in operation of the system to be balanced by a rise in the height of the column 12a due to backing up of solids into the conduit.

Likewise, a conduit 18 extends between the chambers 3 and 4, its lower end being immersed in the fluidized bed 12 of the chamber 3, in the same manner as described above in connection with the conduit 17, a portion of that bed constituting a column 12a of fluidized solids in the conduit. Similarly a conduit 19 extends between the chambers 2 and 3, and has its lower end immersed in the bed 12 of chamber 2, there being a portion of the latter bed forming a column 12a of fluidized solids in the conduit. A further conduit 20 leads out of the chamber 2, providing an outlet for solids from the column 1.

In operation of the system shown in Fig. 1, gas is fed into the column 1 through line 7, and in addition gas is fed through the lines 14, 15 and 16 into the auxiliary chambers formed by the casings 13. Gas rises through the perforated plates 6 and the chambers 2, 3, 4 and 5 at sufficient velocity to maintain the beds 11 of those chambers in a fluidized condition and to prevent any substantial flow of solids downward through the perforations in the plates 6. Likewise, the gas supplied by the lines 14, 15 and 16 rises at sufficient velocity to fluidize the respective beds 12, including the portions 12a thereof.

As finely divided solids are fed into the bed 11 of the chamber 5 by the conveyor 10, solids from that bed overflow into the conduit 17 and fall into the column 12a in the conduit, thereby causing solids to be displaced from the bed 12 of chamber 4 and overflow into the bed 11 of that same chamber. As solids are thus added to the bed 11 of chamber 4, particles from that bed overflow into the conduit 18, through which such particles fall into the column 12a of that conduit, causing solids to overflow from the bed 12 of chamber 3 into the bed 11 of that chamber. In the same manner solids are conveyed from the chamber 3 to the beds 12 and 11 of chamber 2 through the conduit 19. From the bed 11 of chamber 2, solids overflow into the conduit 20, through which they fall out of the column 1.

The height of the upper end of the conduits 17, 18, 19 and 20 above the respective plates 6 through which those conduits extend controls the depth of the beds 11. In the conduit 20, and between the upper end of the conduits 17, 18 and 19 and the columns 12a therein, the solids are in a free-falling, uncompacted and unfluidized state.

The gas pressure above the fluidized beds in each of the chambers 3, 4 and 5 is lower than the gas pressure in the next lower chamber. Moreover, at times the gas pressure in each of the four chambers varies. A principal cause of such variation is a change in bed level in one of the chambers. The most severe condition of that type occurs when the beds 11 are being established initially, for in that case the bed 11 in the upper of two chambers is fully established before the bed 11 of the next lower chamber begins to form. Also, fluctuation in the gas pressure in adjacent chambers may occur due to the turbulent motion of the beds, or to variations in rate of feed of solids into a chamber.

The pressure drop between any two adjoining chambers containing beds 11 is balanced by that portion of the column 12a in the conduit between those two chambers which is above the surface level of the portion of the bed 12 lying outside of the conduit. When an increase occurs in the gas pressure in one chamber relative to the gas pressure in the next higher chamber, solids from the bed 12 in the lower of the two chambers back up in the conduit extending between the two chambers. As mentioned previously, the lower ends of the conduits 17, 18 and 19 are immersed deeply enough in the beds 12 that the volume of solids in such bed which lie outside of the conduit and above the outlet thereof is large enough for solids to back up into the conduit from that bed until the pressure drop through the column of solids in the conduit has increased enough to offset the increase in gas pressure differential between the two chambers. Otherwise the level of the bed 12 would fall below the outlet end of the conduit due to the increase in gas pressure differential between the two chambers. Thereupon gas from the lower of the two chambers would by-pass through the conduit, rather than rising through the bed of solids above the plate 6 between the two chambers.

The beds 12 need only be large enough to perform the above-described "sealing" of the conduits, and as indicated in the drawing, can be small in area as compared with the beds 11. They may be fluidized by the same kind of gas which is fed through the feed line 7, or by a different gas when desirable.

A system such as that described above can be put into operation initially by first establishing the beds 12 by feeding gas through lines 14, 15 and 16, and introducing finely divided material into the auxiliary chambers formed by the casings 13 through the gas lines 14, 15 and 16, or through openings in the wall of column 1. Once the lower ends of the conduits 17, 18 and 19 have been covered by the fluidized beds 12, gas rising through the column 1 will pass through the perforations in the plates 6, rather than by-passing through the conduits. The bed 11 of chamber 5 can be established by admitting a stream of gas into the column through the line 7, and then feeding finely divided material into the chamber 5, where it will be fluidized by gas rising into that chamber through the uppermost plate 6. The bed 11 of chamber 5 will build up to the level of the upper end of the conduit 17, and as further solids are fed into that bed thereafter, particles from the bed overflow into the conduit 17 and fall through it into the bed 12 of chamber 4, causing solids in the latter bed to spill over the upper edge of the casing 13 containing that bed. Such solids are then fluidized by gas rising through the plate 6 at the base of chamber 4, and form the bed 11 of that chamber. In the same way the fluidized beds 11 of the chambers 3 and 2 are formed successively. In view of the fact that the beds 12 are maintained independently of the beds 11, it is immaterial—as far as the "sealing" of the conduits by the beds 12 is concerned—how low the beds 11 may be, or may become during operation of the system.

Moreover, if the system should be shut down, the particles in the beds 12 settle to the lower part of the casings 13. In again starting up the system, gas lines 14, 15 and 16 need only be turned on to again fluidize those particles and immerse the lower ends of the conduits 17, 18 and 19 in the beds 12, after which the various beds 11 can be re-established successively by introducing gas through the line 7, and feeding solids into the chamber 5.

In the modification shown in Fig. 2, a vertical column 101, having a gas feed line 107 and a gas outlet line 108, is divided into chambers 102, 103, 104 and 105 by spaced perforated plates 106, the chambers having fluidized beds 111 therein. Chambers 102, 103 and 104 are provided with extensions which contain fluidized beds 112 and are formed by the cylindrical casings 113 attached to the column 101. Gas is supplied to those casings by the gas lines 114, 115, and 116 and rises through the perforated plates 106' in the casings. Conduits 117, 118 and 119 extend between the casings 113 and the next higher chambers to convey solids from the tops of the beds 111 into the beds 112. The lower ends of the conduits are immersed in the beds 112, as in the case of the conduits 17, 18 and 19 of Fig. 1, and portions of those beds extend upward into the conduits, such portions being designated 112a. Outside of each conduit and above the lower end thereof is a sufficient volume of fluidized solids for the column of fluidized solids in the conduit to increase in height sufficiently to offset any increase which occurs in gas pressure differential between one chamber and the next higher chamber during operation of the system. The column 101 is provided with a conduit 109 and screw conveyor 110 therein for feeding finely divided material into the chamber 105, and with a discharge conduit 120 through which solids leave the chamber 102.

The system shown in Fig. 2 operates similarly to that shown in Fig. 1, with solids from the fluidized beds 111 overflowing into the beds 112, and the beds 112 serving to "seal" the lower ends of the conduits 117, 118 and 119, regardless of fluctuations in the gas pressure differential between the two chambers between which the respective conduits transfer particles.

The system shown in Fig. 3 is a modification of that of Fig. 2, the chambers 202, 203, 204 and 205 being located in separate vessels, instead of one being directly above the next, as in Fig. 2. The chambers contain beds 211 of solids fluidized by gas rising through the perforated plates 206. Cylindrical casings 213 form extensions of the chambers 202, 203 and 204, and contain beds 212 of solids fluidized by gas streams fed into the bottom of those casings. Pipes 221 connect adjoining vessels and conduct gas from the upper portion of one vessel to the bottom of the next. The system operates similarly to that of Fig. 2, the solids being transferred from one chamber to the next through a conduit whose lower end is immersed in a bed 212, from which solids overflow into the adjacent bed 211.

Gas-solids contact systems such as are described above can be used for various purposes, such as for effecting reactions between a gas and solid particles; in contacting a gas or a mixture of gases with catalyst particles, and in transferring heat between a gas and solid particles.

I claim:

1. In a system comprising a pair of chambers containing beds of finely divided fluidized solids, the gas pressure in one of the said chambers being lower than the gas pressure in the other of said chambers, and the gas pressure differential between the said two chambers being subject to fluctuation, the method of transferring solids from the said chamber of lower gas pressure to the other of said chambers, comprising overflowing solids from the surface of the fluidized bed of solids in the said chamber of lower gas pressure into a downwardly directed conduit having an outlet immersed in a fluidized bed of solids in the said chamber of higher gas pressure, conducting the overflowed solids into the latter bed through the said conduit, and overflowing solids from the latter fluidized bed into a second fluidized bed in the said chamber of higher gas pressure, the said two fluidized beds of solids in the said chamber of higher gas pressure being fluidized respectively by separate gas streams, a portion of the said bed in which said outlet is immersed extending upward into the said conduit and forming therein a column of fluidized solids of sufficient height to balance the pressure drop between the said chambers, and there being sufficient fluidized solids of that same bed above the said outlet and outside of the said conduit for the maximum increase which occurs in pressure drop between the two chambers during operation of the system to be balanced by a rise of fluidized solids of that bed in the conduit.

2. The method in accordance with claim 1, in which the said fluidized bed in which the said outlet of the conduit is immersed is in an auxiliary chamber forming part of the said chamber of higher pressure.

References Cited in the file of this patent

UNITED STATES PATENTS

| | | |
|---|---|---|
| 2,428,872 | Gunness | Oct. 14, 1947 |
| 2,506,307 | Martin | May 2, 1950 |
| 2,525,925 | Marshall | Oct. 17, 1950 |
| 2,582,688 | Ford | Jan. 15, 1952 |